United States Patent [19]

Mazzoni

[11] Patent Number: 4,474,545
[45] Date of Patent: Oct. 2, 1984

[54] DEVICE FOR MANUFACTURING MULTICOLORED MARBLE SOAPS, FROM A BASE PASTE AND ONE OR MORE LIQUID PIGMENTS

[75] Inventor: Guido Mazzoni, Busto Arsizio, Italy

[73] Assignee: Construzioni Meccaniche G. Mazzoni S.p.A., Busto Arsizio, Italy

[21] Appl. No.: 399,973

[22] Filed: Jul. 20, 1982

[30] Foreign Application Priority Data

Jul. 22, 1981 [IT] Italy ............................... 23074 A/81

[51] Int. Cl.³ ............................................... B29F 3/12
[52] U.S. Cl. .................................. 425/131.1; 252/367; 264/75; 425/198; 425/205; 425/207; 425/381
[58] Field of Search ................ 425/131.1, 198, 376 A, 425/192 R, 205, 207, 381; 264/75; 252/367

[56] References Cited

U.S. PATENT DOCUMENTS

| | | | |
|---|---|---|---|
| 1,083,275 | 1/1914 | Eberhard | 264/75 |
| 2,257,067 | 9/1941 | Parsons | 264/75 |
| 2,332,829 | 10/1943 | Parsons et al. | 264/75 |
| 2,507,819 | 5/1950 | Schneider | 425/207 |
| 2,640,033 | 5/1953 | Marshall | |
| 3,171,160 | 3/1965 | Moyer | 425/207 |
| 3,485,905 | 12/1969 | Compa et al. | 425/205 |
| 3,609,828 | 10/1971 | Compa et al. | 425/205 |
| 3,676,538 | 7/1972 | Patterson | 425/131.1 |
| 3,823,215 | 7/1974 | D'Arcangeli | 425/131.1 |
| 3,940,220 | 2/1976 | D'Arcangeli | 425/205 |
| 4,127,372 | 11/1978 | Perla et al. | 425/205 |

FOREIGN PATENT DOCUMENTS 2128707 10/1972 France .
1460787 1/1977 United Kingdom .

*Primary Examiner*—Jeffery R. Thurlow
*Attorney, Agent, or Firm*—Fleit, Jacobson, Cohn & Price

[57] ABSTRACT

Pressurized colored liquids are inserted in the base mass, immediately upstream or in correspondence with the last homogenizing means; then a rotor arranged between the last perforated refining means and the extrusion hole, provides for a partial mixing of the paste. The speed of rotation of the rotor is adjustable from outside of the extrusion head, and independent of the speed of the extrusion screw.

9 Claims, 3 Drawing Figures

DEVICE FOR MANUFACTURING MULTICOLORED MARBLE SOAPS, FROM A BASE PASTE AND ONE OR MORE LIQUID PIGMENTS

The invention relates to a device for continuously manufacturing a multicolored soap starting from a base soap in which liquid colored products are added.

A device using the injection of a liquid into a pasty product to provide striations in the outlet bar is already known from French Pat. No. 2,128,707. In this case a perforated plate is used for forming pellets and the injection is made between the pellets, creating—as the inventors' ensure—color lines in the base product. However, such a device has the disadvantage of using a single colored liquid and does not provide the possibility of "moving" the colored striations in the outlet bar, thus providing only a more or less uniformly striped product.

A device indifferently using one or more injections of colored liquids has been described in British Pat. No. 1,460,787. However, said device provides a multicolored but constant patterned soap.

The poor results obtained by the above methods according to which the so-called multicolored product actually resulted a simple striated product, have urged the market to produce marbleized soaps starting from two differently colored soap pastes (see U.S. patents to D'Arcangeli U.S. Pat. Nos. 3,823,215 and 3,940,220). This makes the apparatus complicated and expensive.

Therefore, it is the object of the present invention to create a marbleized effect starting from a base soap and from a liquid pigment, said marbleized effect being perfectly similar to marble.

The above mentioned object has been achieved by providing a rotor between the last perforated refining means and the bar extrusion hole. This rotor will substantially occupy all the available section of the extrusion head in that zone. Preferably the rotor will be operated from the outside independently of the extrusion screw, so that this latter will define the desired delivery, while the rotor will define the "marble" effect.

It has also been found that, for constant values of the outlet flow rate at the extruder, there is a ratio between the section area where the rotor is placed, the area of the extrusion hole provided at the outlet, and r.p.m. of said rotor which enables to preserve the optimum pattern generated by the rotor.

Said characteristic ratio is as follows:

$$K = \frac{Ar}{Af} \frac{1}{n^\alpha}$$

wherein:
Ar is the area in sq.mm. of the head section where the rotor is located;
Af is the area in sq.mm. of the extrusion hole of the die at the extruder outlet;
n is the rotor r.p.m.
α is a factor of experimental correlation, the value of which is in the range of 1.00–1.35, particularly 1.15–1.25.

Good values for K are those in the range of 0.11–0.60, the optimum value being about 0.28.

It is readily apparent that in the device according to the invention the desired appearance of the product can be maintained when the outlet mounted die varies, by merely varying the speed of rotation of the rotor. Thus, a preferred solution of the invention provides that the rotor operation is adjustable from outside, for example by means of a variator.

The injection of the colored liquid(s) always occurs upstream of the rotor. It may also occur on the refining means or also preferably upstream of the latter, the colored liquid(s) being supplied in nozzles provided on spokes or on a perforated plate arranged upstream of the refining means. Preferably four spokes are provided; on these, radially displaceable nozzles can be mounted.

Thus, such parameters as temperature and chemical-physical properties of the extruded pasty material will be taken into account, owing to the possibility of radially displacing the four injections. For relatively hard products, it has been found convenient to outwardly displace at least two injections, but only direct tests with specific products will provide the optimum solution.

In accordance with another preferred embodiment, a further advantage of the device according to the present invention is that it is fully independent from the type of extruder to which it is applied, so that it can be mounted on any existing extruding machine; being capable of always providing optimum results as to "marbling" the pasty material being processed.

Some unrestrictive embodiments of the device according to the invention will now be described with reference to the accompanying drawing, in which.

The pressurized colored liquid circulating in circuit 1, also provided with flexible recirculating tubes 2, arrives at the color distributing spokes 3, then, after having passed through non-return valves 36 is inserted in the compact material being processed.

Figure 2:
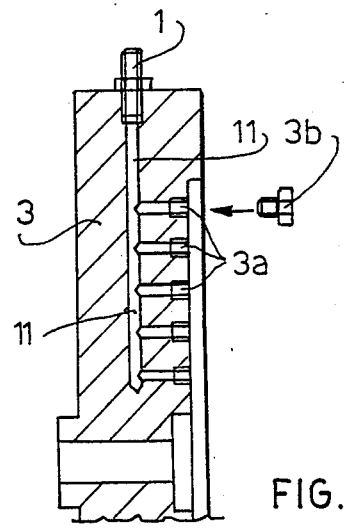
FIG. 2 is a sectional view of the spokes shown in FIG. 1.

FIG. 2 is a sectional view of a spoke 3 and shows how each individual injection nozzle comprising the non-return valve 3b can vary its radial distance. This variation is obtained by screwing non-return valves 3b or plugs (not shown) on the opening ends 3a of the conduit 11 foreseen in spokes 3.

This is an extremely important possibility. Thus, this distance shall be experimentally calculated at the start of the device, mainly depending on the chemical-physical properties of the product being used.

In the device according to the present invention the valve displacements are extremely easy and fast because they can be made simply by screwing and unscrewing members.

In this case, downstream of the colored liquid distributing spokes 3, a refining means is provided as comprising a perforated plate 7. Thus, the assembly comprising the pasty material and color after passing through the spokes 3, is refined by the perforated plate 7, then compacted in the extrusion head 4 and mixed by the rotor 5 and finally a marble bar exits from the die 8. The rotor 5 has such dimensions as to substantially occupy the entire free section of the zone where said rotor has been mounted.

Said rotor 5 is driven from outside, by an angular transmission 6, which has been shown by way of unrestrictive example.

The expedient of driving from outside, independently of the speed of rotation of the Archimedian screw, is of extreme usefulness, as the extent of solid-liquid mixing can be varied as desired, and accordingly an easily "adjustable" vein can be obtained in the bar at the extruder outlet.

Figure 3:
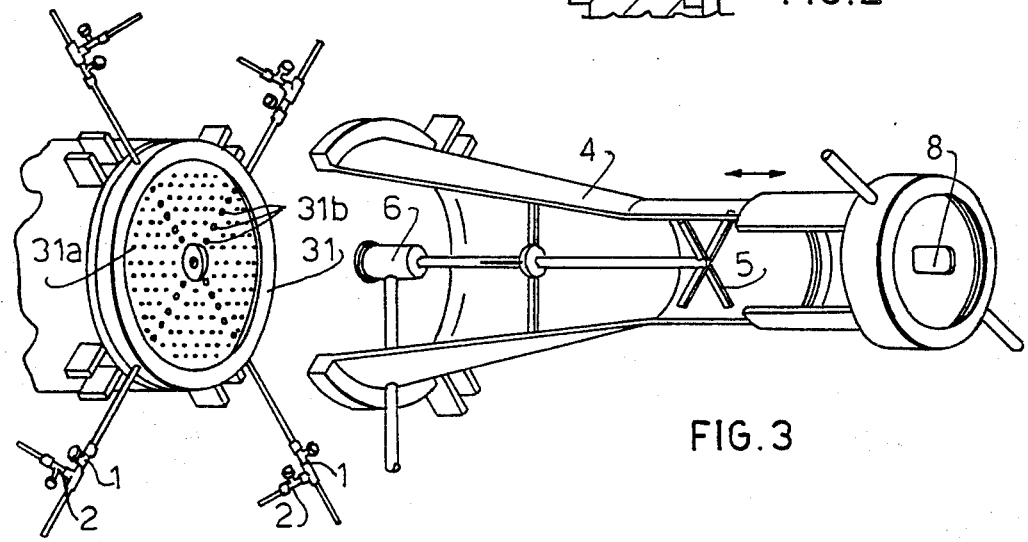
FIG. 3 is an exploded view of a second embodiment of the invention.

By the detail 31, a variant to the colored liquid injecting system is shown in FIG. 3. Thus, also a perforated plate can be used, either with holes in the range of 8–30 mm, but preferably in the range of 10–20 mm, which can provide a product of different appearance. Nozzles 31b are provided in plate 31a and connected with coloured liquid circuit 1.

Figure 1:
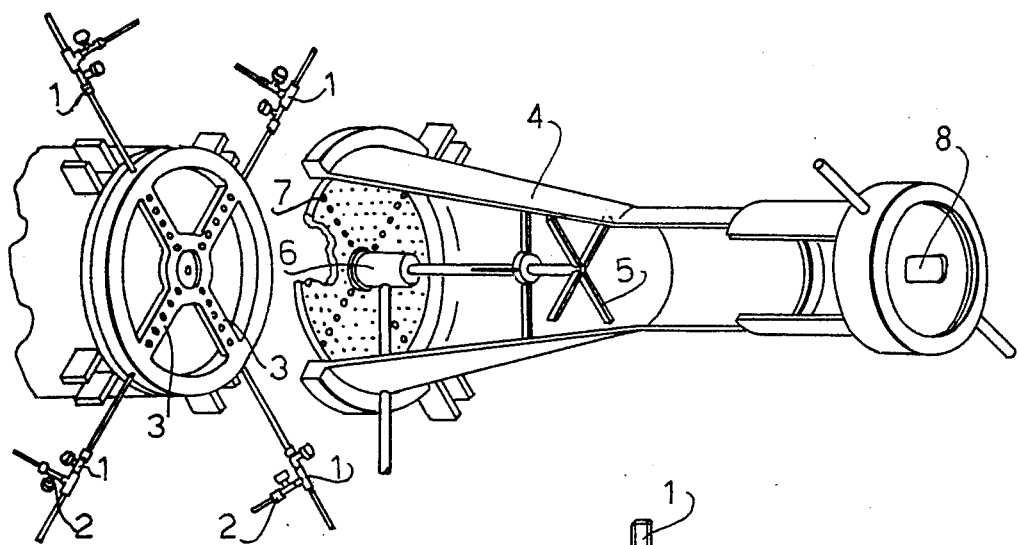
FIG. 1 is an exploded view of a first embodiment.

The position of the rotor shown in FIG. 1 is not necessarily limited to the conical length of the extrusion head but, see FIG. 3, it may be positioned also in the cylindrical section of the head. Preferably this section has a variable length, in order to ensure a good compactness of the extruder bar.

What I claim is:

1. A device for producing a multicolored marble soap comprising:
    extruder means for providing a soap paste and including an extrusion head having an inlet and an outlet;
    refining means positioned adjacent the inlet of said extrusion head;
    a die positioned at the outlet of said extrusion head;
    an injection device for injecting at least one colored liquid into a soap paste and positioned adjacent said refining means, said injection device including a plurality of substantially radially extending conduits, each conduit including a plurality of injection openings facing the outlet of said extrusion head; and
    rotor means downstream of said injection device and rotatably supported between said refining means and said die, said rotor means extending substantially completely across the entire cross section of the extrusion head to mix the soap paste and the colored liquid to provide a multicolored soap, said rotor means operable by rotation means external to said extrusion head and external to and independent of said extruder means.

2. A device according to claim 1, wherein the coefficient K given by the formula $$K = \frac{Ar}{Af} \; \frac{1}{n^\alpha}$$

is in the range of 0.11–0.60; wherein:
    Ar is the area in sq.mm. of the section of the extrusion head at the location where the rotor means is placed;
    Af is the area in sq.mm. of the extrusion head outlet;
    n is the r.p.m. of the rotor; and
    $\alpha$ is a factor of experimental correlation, the value of which is in the range of 1.00–1.35, preferably 1.15–1.25.

3. A device according to claim 2, wherein the value of said coefficient K is about 0.28.

4. A device according to claim 1 wherein said injection device includes a plurality of radial spokes extending into the soap paste.

5. A device according to claim 1, wherein said injection device is positioned immediately upstream of said refining means.

6. A device according to claim 1, wherein said injection device is integral with said refining means.

7. A device according to claim 1, wherein said injection device includes a plurality of nozzles that are radially displaceable.

8. A device according to claim 1, wherein said extrusion head includes a conical portion and a cylindrical portion downstream of said conical portion, said rotor means positioned in the portion of said extrusion head which is of cylindrical configuration.

9. A device according to claim 8, wherein the cylindrical portion of the extrusion head is of variable length.

* * * * *